Aug. 11, 1953 　　　J. C. LEBENS, JR 　　　2,648,739
PROTECTOR FOR ELECTRIC CIRCUITS
Filed April 30, 1951
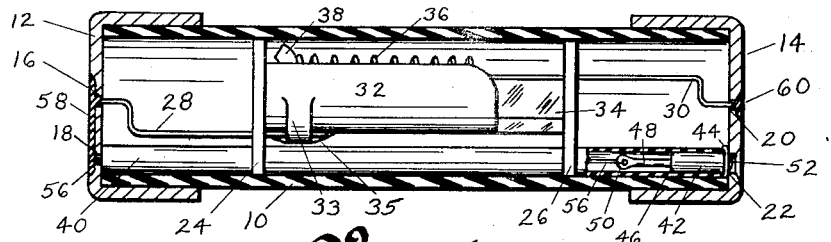
Fig. 1
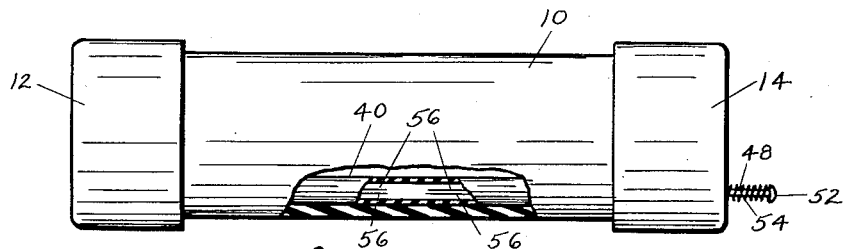
Fig. 2
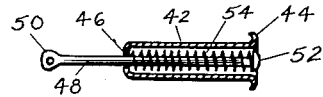
Fig. 3
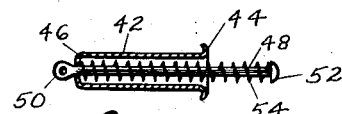
Fig. 4
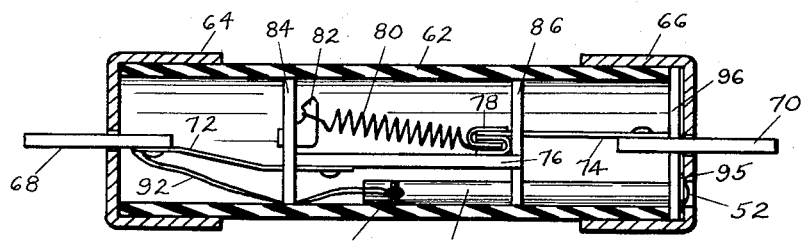
Fig. 6　　　Fig. 5
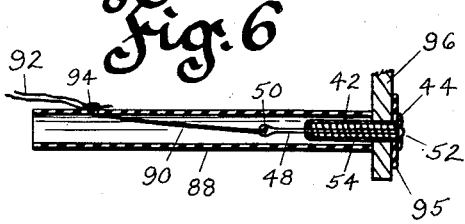
INVENTOR
John C. Lebens Jr.
BY
Rey Eilers
ATTORNEY Patented Aug. 11, 1953

2,648,739

UNITED STATES PATENT OFFICE 2,648,739

PROTECTOR FOR ELECTRIC CIRCUITS

John C. Lebens, Jr., University City, Mo., assignor to McGraw Electric Company, Elgin, Ill., a corporation of Delaware Application April 30, 1951, Serial No. 223,720

20 Claims. (Cl. 200—121)

1

This invention relates to improvements in protectors for electric circuits. More particularly, this invention relates to improvements in protectors for electric circuits which are equipped with indicators that provide, at all times, a visual indication of the condition of such protectors.

It is therefore an object of the present invention to provide an improved protector for electric circuits which is equipped with an indicator that provides, at all times, a visual indication of the condition of such protector.

Protectors for electric circuits are customarily enclosed within casings; and in many instances the casings consist of hollow tubes of insulating material which telescope over the protectors for electric circuits, and ferrules of metal that close the ends of those tubes. The casings protect the component parts of the protectors for electric circuits from injury which they might otherwise sustain through contact with foreign objects, and they also protect nearby individuals and objects from the heat and flame which often accompanies the circuit-protecting operation of protectors for electric circuits.

The hollow tubes, which are part of the casings for such protectors for electric circuits, are often composed of opaque insulating material such as fiber; and it is therefore usually impossible to determine visually the condition of the protectors for electric circuits. As a result, maintenance men frequently must test a number of protectors for electric circuits before then can locate the particular protector that has acted to open the circuit. This is a time-consuming process; and it is at best a hit-or-miss process.

In recognition of this problem, various attempts have been made to develop operative and successful protectors for electric circuit which had indicators that could provide a visual indication of the condition of the protectors for electric circuits. While many such protectors for electric circuits were proposed, only a few were actually manufactured; and few, if any, of such protectors are now being manufactured. The indicators of such protectors for electric circuits usually consisted of small diameter wires which extended between the metal ferrules of the casings of the protectors and which held cantilever springs or spring-mounted discs in retracted position; those wires fusing whenever the protectors operated to open the circuit, and thus permitting the springs and discs to move to extended position where they could be seen. The indicators of such protectors for electric circuits often failed to operate at all, and in some instances they operated prematurely

2 and gave false indications of the condition of the protectors.

The defective operation of the indicators for these protectors for electric circuits frequently was caused by variations in the spacing between the metal ferrules of the casings of the protectors; such variations in spacing being caused by expansion or contraction of the tubes of the casings for the protectors for electric circuits. The expansion or contraction of the tubes of such casings is unavoidable where those tubes are made of fiber, since fiber expands and contracts as the moisture in the air varies the moisture content of the fiber; and the expansion or contraction of the tubes stretches or slackens the small diameter wires extending between the ferrules at the ends of these tubes. The stretching of the small diameter wires of the indicator could either break those wires and thus free the springs or discs prematurely, or they could provide such an elongation of those wires that the springs or discs could move appreciable distances toward extended position when the tubes next contracted. Alternatively, the stretching of those wires could distort or jam the springs of the indicators. The slackening of the wires could permit the springs or discs to move toward extended position. In any of these events, defective or false indications of the condition of the protectors for electric circuits can not be avoided. Such false or defective indications are worse than no indications at all, because they mislead the maintenance man when he attempts to locate a protector which has operated to open the circuit.

The present invention provides a protector for electric circuits which will not give false or defective indications of the condition of said protector; such protector having an indicator with elongated telescoping elements. These elements are biased for movement to extended position by a spring but are normally held in retracted position by a small diameter wire; and the telescoping elements and the spring can easily compensate for any expansion or contraction of the tube of the casing of the protector. Consequently, the indicator is kept from giving false or premature indications of the condition of the protector for electric circuits. It is therefore an object of the present invention to provide an indicator for protectors for electric circuits which has elongated telescoping elements and a spring biasing those elements toward extended position.

In many protectors for electric circuits, the elongated telescoping elements and the springs can provide full compensation for the expansion and contraction of the casings. However, in some protectors for electric circuits which have elongated casings, the amount of expansion and contraction that must be accommodated is excessive. The present invention makes successful indicator operation possible in such protectors by making the small diameter wires of the indicators for such protectors wholly independent of the expansion or contraction of the casings of those protectors for electric circuits. The present invention does this by providing a short closure for the small diameter indicator wires, and by mounting that closure so its length will not be affected by changes in the length of the casing for the protector for electric circuits. It is therefore an object of the present invention to provide a short closure for the indicator wires of a protector for electric circuits which can be mounted so its length will not be affected by changes in the length of the casing of such protector.

Indicators have been known to give false indications in protectors for electric circuits because the resistances of the protectors for electric circuits could increase, with overloads, to the point where the indicator wires carried enough current to become hot and heat the springs associated with them. In some instances, where the overloads recurrently reached values that normally would cause the protector to open the circuit but would subside before the protector would have to operate, the indicator wires have become hot enough to take the temper out of the springs associated with the indicators. In such instances the springs would be unable to move the indicator to indicating position when the protector for electric circuits did open the circuit. The present invention obviates excessive heating of the springs associated with the indicator wires of protectors for electric circuits by reducing the overall length of the fusible portions of the indicator wires, and by surrounding the springs with relatively massive heat absorbing elements. The reduced length of the fusible portions of the indicator wires reduces the amount of heat generated by the indicator wires, and the surrounding of the springs with heat absorbing elements quickly dissipates heat from the springs. It is therefore an object of the present invention to reduce the length of the fusible portion of the indicator wires of protectors for electric circuits, and to surround the springs associated with those wires by heat absorbing elements.

To operate effectively, an indicator wire must have a smaller current carrying capacity than the protector for electric circuits with which it is used. Customarily this means that the indicator wire must be of very small cross section. Such a wire is fragile indeed, and it could become bent, pinched, or broken during the assembly of the protector for electric circuits with the casing for such protector. The present invention obviates any such pinching, bending or breaking of the indicator wire by disposing that wire within a closure which in turn is disposed within the casing for the protector for electric circuits. This closure not only protects the wire against pinching, bending or breaking, but it provides an obstruction-free pathway for the indicator wire to follow when the telescoping elements move it as they move to extended position.

Some indicators which have been proposed for use with protectors for electric circuits would be mounted on the exterior of the casings of the protectors. Such indicators are subject to being broken, bent or distorted by contact with foreign objects; and they would then be prevented from operating properly. This is objectionable. The present invention obviates this objection by disposing the indicating portions of the indicator wholly within the casing of the protector for electric circuits.

Other and further objects and advantages of the present invention should become apparent from an examination of the drawing and accompanying description.

In the drawing and accompanying description two preferred embodiments of the present invention are shown and described, but it is to be understood that the drawing and accompanying description are for the purpose of illustration only and do not limit the invention and that the invention will be defined by the appended claims.

In the drawing

Fig. 1 is a cross-sectional, side view of a protector and indicator that is made in accordance with the principles and teachings of the present invention, and it shows the indicator in retracted position, Fig. 2 is a partially broken-away, side elevational view of the protector and indicator shown in Fig. 1, and it shows the indicator in extended position, Fig. 3 is a cross-sectional, side view of the telescoping elements and spring of the indicator shown in Figs. 1 and 2, and it shows that element in retracted position, Fig. 4 is a cross-sectional, side view of the telescoping elements and spring shown in Figs. 1-3, and it shows those elements in extended position, Fig. 5 is a cross-sectional, side view of another form of protector and indicator, and Fig. 6 is a cross-sectional, side view of the telescoping elements, spring and fusible wire of the indicator shown in Fig. 5.

Referring to the drawing in detail, the numeral 10 denotes a cylindrical tube which is made of an insulating material such as fibre. The numeral 12 denotes a metal ferrule which telescopes over the left hand end of the tube 10; and the numeral 14 denotes a ferrule 14 which telescopes over the right hand end of the tube 10. The tube 10 and the ferrules 12 and 14 constitute the casing for a protector for electric circuits; the ferrules 12 and 14 also constituting the terminals for that protector.

Ferrule 12 has an elongated opening 16 therethrough at the approximate center thereof, and it has an opening 18 therethrough adjacent one side thereof. Ferrule 14 has an elongated opening 20 therethrough adjacent the center thereof, and it has an opening 22 therethrough adjacent one side thereof. When the ferrules 12 and 14 are telescoped over the opposite ends of the tube 10, the openings 16 and 20 should be aligned and registered, whereupon the openings 18 and 22 will be in register.

Supports 24 and 26, in the form of discs, are disposed within the tube 10 intermediate the ends of that tube. These discs are of insulating material such as fibre, and they have openings therethrough, not shown, which receive and support fusible links 28 and 30. The fusible links 28 and 30 are wider than they are thick and have an elongated cross section. Fusible link 28 will extend from the opening 16 in ferrule 12 through the opening in disc 24 to one end of a generally U-shaped metal heat absorber 32. A loop-like projection 33 is punched from the body of the heat absorber 32, and the right hand end of the fusible link 28 is inserted between that projection and the body of the heat absorbing member 32. Solder 35 is then used to provide a fully intimate electrical connection between the fusible link 28 and the heat absorber 32. The right hand end of the fusible link 30 is in register with the opening 20 in ferrule 14, and the left hand end of that fusible link extends through the opening in disc 26 and overlies the right hand end of the heat absorbing member 32.

A light-weight connector 34 extends between the left hand end of the fusible link 30 and the right hand end of the heat absorbing member 32, and normally maintains them in electrical connection. A spring 36 is secured to the left hand end of the connector 34 and to a hook 38 which is riveted to the disc 24. The spring 36 applies a biasing force to connector 34; and whenever the solder which normally maintains the connector 34 in assembled relation with fusible link 30 and heat absorbing member 32 softens, the spring 36 will move the connector 34 out of the electrical connecting relation with fusible link 30 and heat absorbing member 32. This opens the protector and prevents further current flow through it between ferrules 12 and 14. Either of the fusible links 28 or 30 can respond to heavy overloads or short circuits to fuse and thereby open the circuit.

A closure 40, in the form of an elongated tube of insulation, is disposed within the casing for the protector for electric circuits. This closure will rest in and be confined by holes or notches in the edges of the discs 24 and 26; the closure 40 being held against movement by the conjoint action of discs 24 and 26 and tube 20. The discs 24 and 26 are dimensioned so the ends of the closure 40 will be in register with the openings 18 and 22 in ferrules 12 and 14 whenever the ends of the fusible links 28 and 30 are placed in register with the openings 16 and 20 in ferrules 12 and 14. Thus the discs 24 and 26 facilitate rapid assembly of the protector, indicator and casing shown in Figs. 1 and 2. The closure 40 is free of obstructions throughout its length, and it communicates directly with the openings 18 and 22.

The numeral 42 denotes a sleeve of metal which has a flange 44 at one end thereof and which has a perforated end wall at the other end thereof. Sleeve 42 is dimensioned so it can telescope within the right hand end of the closure 40, but the flange 44 is dimensioned so it will engage the right hand end of closure 40 and prevent unlimited movement of the sleeve 42 inwardly of closure 40. An elongated pin 48 extends through the perforated end wall 46 of the sleeve 42, and that pin has a planished end 50 with a hole therethrough. In addition, that pin has an enlarged head 52 at its other end. Prior to the planishing of the left hand end of the pin 48, a helical spring 54 is slipped over the left hand end of the pin; and the left hand end of the pin is passed through the opening in the perforated end wall 46 of the sleeve 42. The planishing of the left hand end of pin 48 maintains the sleeve 42, the pin 48 and the spring 54 in assembled relation. The head 52 of pin 48 is painted or otherwise provided with a color and hue which is different from the color and hue of the tube 10 and of the ferrule 14.

A small diameter, readily fusible wire 56 of low current-carrying capacity is threaded through the opening in thee planished end 50 of pin 48, and the two ends of that wire are passed through closure 40. The fusible links 28 and 30, the heat absorber 32, the connector 34 and the spring 36 constitute a protector for electric circuits. The sleeve 42, the pin 48, the spring 54 and the wire 56 constitute an indicator. The protector is initially assembled with the discs 24 and 26, the indicator is initially assembled with the closure 40, the closure 40 is then assembled with the discs 24 and 26, and then the discs 24 and 26 with the protector and the closure 40 mounted thereon are telescoped within the tube 10. Ferrule 14 is then set so the elongated opening 20 therethrough registers with the elongated cross section of fusible link 30, and that ferrule is telescoped over the right hand end of tube 10. The pin 48 will slip neatly through opening 22 in ferrule 14 since the placing of opening 20 in register with fusible link 30 simultaneously placed closure 40 in register with opening 22. The ferrule 14 will be pressed tightly enough against flange 44 of sleeve 42 to be in electrical contact. The left hand ends of wire 56 are passed through opening 18 in ferrule 12, the openings 16 and 18 of that ferrule are aligned with fusible link 28 and closure 40 respectively, and that ferrule is telescoped over the left hand end of tube 10.

The wire 56 is then pulled to the left with sufficient force to overcome spring 54 and to move pin 48 largely within sleeve 42. This is the retracted position of pin 48, and it should be such that the enlarged head 52 of pin 48 is wholly within the casing of the protector for electric circuits but is immediately adjacent the opening through which that head can move to the exterior of such casing. Once this initial position of pin 48 has been attained, the left hand ends of wire 56 are soldered to ferrule 12 by means of solder 58. This solder will also electrically connect the left hand end of fusible link 28 to the ferrule 12 and to the wire 56. Solder 60 is then applied to ferrule 14 and to the right hand end of fusible link 30. This solder will connect fusible link 30 directly to ferrule 14 and indirectly to sleeve 42.

The pin will rest against some part of the perforated end wall 46 of the sleeve 42 because the action of the spring 54 will be to shift the pin against some part of that end wall. Consequently, current can flow from the sleeve 42 directly into the pin 48 and then to the wire 56. A secondary electrical path of subordinate nature will exist between sleeve 42 and pin 48 through the spring 54. However, because of the length of the spring 54, the major portion of the current flowing from sleeve 42 to pin 48 will pass directly through the end wall 46 to the pin 48.

Current can flow from the ferrule 12 to the ferrule 14 either through fusible link 28, heat absorber 32, connector 34 and fusible link 30 or through wire 56, pin 48, and sleeve 42. The wire 56, the pin 48 and the sleeve 42 thus constitute an electrical conductor in parallel relation with the protector for electric circuits consisting of fusible links 28 and 30, heat absorber 32, connector 34, and spring 36. The protector will be able to carry current continuously under normal conditions of load, but the wire 56 will fuse instantly when the protector opens the circuit. Fusion of wire 56 will free pin 48 for movement outwardly through opening 22 to the position shown in Fig. 2. The pin 48, its enlarged head 52, and the right hand end of spring 48 thus provide a visual indication of the condition of the protector.

By making the enlarged head 52 of the elongated pin 48 of a color or hue different from the color or hue of tube 10 and ferrule 14, the present invention makes it possible for the user to see that enlarged head when it is wholly within the casing for the protector, as well as to see it when it is wholly outside of that casing. If the enlarged head 52 could not be seen when it was wholly within the casing for the protector, the user might believe the indicator had gotten lost or he might believe that the opening 22 had been formed in the ferrule 14 by mistake and that the protector did not have an indicator. While the enlarged head 52 of pin 48 can be seen in its retracted position when the protector is viewed from the end, that protector can not be seen in its retracted position when the protector is viewed from the side. Since protectors are most frequently viewed from the side, there will be no likelihood that the user could mistake retracted for extended position. A user, viewing the protector in a normal manner will be able to see the pin 48 and its enlarged head 52 only when the protector for electric circuits has opened the circuit through it and the wire 56 has fused.

The closure 40 protects the necessarily thin and delicate wire 56 from abuse during the insertion of the protector into the tube 10. Moreover, it keeps the filler material, which will be used to surround the fusible links 28 and 30, from working its way to the sleeve 42 and then working through the hole in the perforated end wall 46 of that sleeve. If that filler material were to get into the sleeve 42, it could interfere with the telescoping movement of pin 48 and spring 54.

If the tube 10 expands in length, the wire 56 will not be subjected to breaking stresses because the sleeve 42 and the pin 48 are sufficiently long that the pin 48 can move further into the sleeve 42 and compensate for the expansion of the tube 10. If the tube 10 shrinks, the enlarged head 52 of the pin 48 will not project through the opening 22 because that head is initially positioned a distance inwardly of the ferrule 14. Consequently, expansion and contraction of tube 10 will not interfere with effective operation of indicator, and will not cause premature or false indications of the condition of the protector.

The cross sectional area of the sleeve 42 is considerably greater than the cross sectional area of the two lengths of wire 56. Accordingly, the sleeve 42 will generate practically no heat as current flows through it. Similarly, the pin 48 has a cross sectional area which is vastly greater than the cross sectional area of the two lengths of wire 56, and thus pin 48 will generate virtually no heat as current flows through it. The overall result of the dimensioning of sleeve 42 and pin 48 is that the spring 54 can remain cool even though the wire 56 would tend to heat. It should also be noted that the wire 56 constitutes a two strand conductor which is shorter than the protector itself. By being shorter than the protector, the two strand conductor has a shorter effective heat generating length than the protector would have if the protector were made throughout of resistance material. Many protectors are made of resistance material throughout and they are often referred to as straight through link-type fuses. With such protectors, the amount of heat generated by the wire 56 will be quite small relative to the heat generated by the protector itself, and the amount of heat generated by the pin 48 and the sleeve 42 will be so very small that it can be neglected. Consequently, the spring 54 will be protected from heating even if the resistance of the protector rises appreciably on overloads and thus increases the heating done by the wire 56.

The elongated pin 48 and the enlarged head 52 thereof constitute the most prominent part of the visual indication provided by the indicator disclosed herein. However, the spring 54 does act as an indicator too because it projects from the ferrule 14. While the pin 48 could be modified by eliminating its planished end 50 and by making that pin short enough to be wholly within the sleeve 42 when in retracted position, so the spring 54 would be the principal visual indication provided by the present invention, it is desirable to use the pin 48 in the form shown. The planished end prevents separation of the pin 48 from the sleeve 42 and thus assures a continuing visual indication of circuit-opening operation of the protector. In the absence of the planished end 50, the pin 48 could become lost and then the user might not look at the ferrule 14 from the end; and if he did not do so he would not realize that the protector had opened the circuit. Thus the planished end 50 of the pin 48 positively assures full and complete visual indication of the condition of the protector for electric circuits.

In Fig. 5 the numeral 62 denotes a tube of insulating material such as fibre. This tube is provided with metal ferrules 64 and 66 which have elongated openings therein. The ferrule 66 has a second opening therein adjacent one side thereof. Terminals 68 and 70 of a protector for electric circuits are normally disposed within and supported by the elongated openings in ferrules 64 and 66. Fusible links 72 and 74 are secured to the inner ends of terminals 68 and 70 by rivets and solder. The inner end of the fusible link 72 extends through an opening, not shown in a disc-like support 84 and is soldered and riveted to one end of a heat absorber 76. The inner end of the fusible link 74 extends through an opening, not shown, in the disc-like support 86 and overlies the other end of the heat absorber 74. A connector 78 is soldered to the link 74 and to the heat absorber 76, and that connector is biased for movement out of engagement with link 74 and absorber 76 by a helical spring 80. The helical spring is placed under tension by being slipped over a hook 82 which is riveted to the disc 84.

A closure 88 of tube-like configuration is supported by a slot, not shown, in the periphery of the disc 86. That slot is dimensioned so the closure 88 will be held tightly whenever the disc 86 is disposed within the tube 62. The left hand end of the closure 88 bears against a metal support 96 which has a length greater than the inner diameter of the tube 62 but which has an outer diameter less than the inner diameter of ferrule 66. The support 96 has an opening therethrough and that opening receives a sleeve 42 identical with the sleeve 42 of Figures 1, 3 and 4. A washer 95 of insulating material is interposed between the support 96 and the flange 44 on the sleeve 42. The sleeve 42 will snugly fit within the opening in support 96 and will thus be in electrical connection with that support 96. The support 96 will fit snugly within the ferrule 66 and will thus be in electrical contact with that ferrule. Moreover, the support 96 will fit snugly within an opening in the terminal 70 and will be in electrical connection with that terminal. Consequently, the support 96 acts to place the sleeve 42 in electrical connection with the terminal 70 of the protector for electric circuits.

The sleeve 42 carries an elongated pin 48 similar to the pin 48 of Figs. 1–4, and it also contains a spring 54 similar to the spring in Figs. 1–4. A wire 90 of small diameter is passed through the hole in the planished end 50 of pin 48 and has its left hand end extending through an opening in the left hand end of the closure 88. The left hand ends of the wire 90 are soldered to heavier and more flexible wires 92 which extend to and are soldered onto the terminals 68. The wires 92 are heavy enough and flexible enough to withstand the bending and pinching which they will experience during insertion of the protector, the closure and the supports within the tube 62. Moreover, the wires 92 have a cross-sectional area that is so much greater than the combined cross-sectional areas of the two lengths of wire 90 that the wire 90 will fuse before either of the wires 92 fuses. In this way, the fusing of wire 90 whenever the protector opens the circuit is assured.

Current can flow from terminals 68 to terminals 70 through two paths: one through the fusible links 72, heat absorbers 76, connectors 78 and fusible links 74, and the other through wires 92, wire 90, pin 48, sleeve 42 and support 96. Thus the indicator is in parallel electric relation with the protector. The wire 90 is of such small cross section relation to the cross section of the protector that the wires 90 and 92 will normally carry very little current. However, when the solder which normally holds connector 78 in position softens and permits that connector to move and open the circuit, or when either of the fusible links 72 and 74 fuses to open the circuit, the wires 90 and 92 will have to carry all of the current passing from terminal 68 to terminal 70. The wire 90 will fuse almost instantly and permit the spring 54 to push the enlarged head 52 of pin 48 out through the opening in the ferrule 66 adjacent one side thereof. The support 96 is so dimensioned that when the ferrule 66 is telescoped over the terminals 70 the opening at the side of that ferrule will be in register with the end of the closure 88. The closure 88 is appreciably shorter than the tube 62. Moreover, the closure 88 is disposed wholly within the tube 62, and ferrules 64 and 66. As the result, the overall expansion and contraction of closure 88 will be less than the expansion and contraction of the tube 62 because closure 88 is both short and isolated from the ambient air and its humidity. Reduced overall expansion and contraction of the closure 88 will reduce the stresses on the wire 90 and will reduce the compensation that must be provided by the telescoping elements 42 and 48 of the indicator. If the closure 88 does expand and contract, the expansion will be compensated for by further retraction of the pin 48 within the sleeve 42, and contraction will be compensated for by the space initially left between the enlarged head 52 and the exterior of the ferrule 66. Any expansion and contraction of the tube 62 will not affect the expansion or contraction of the closure 88, and thus the stresses on wire 90 are minimal.

When the fusible portions of the indicator wires are intact, the pin 48 will be in the position shown in Figs. 1, 3, 5 and 6. When the indicator wires have fused, as they will do when the protector for electric circuits operates to open the circuit, the pin will have the position shown in Figs. 2 and 4.

Whereas the drawing and accompanying description have shown and described two preferred embodiments of the present invention, it should be apparent to those skilled in the art that various changes may be made in the form of the invention without affecting the scope thereof.

What I claim is:

1. In an enclosed protector for electric circuits that has a casing, spaced terminals, and an indicator that is adapted to indicate the response of said protector for electric circuits to a predetermined electrical condition in the circuit that said protector for electric circuits protects, the improvement which comprises a current-carrying electrical conductor that is electrically connected in parallel relation with said protector for electric circuits, said electrical conductor being subject to fusing currents whenever said protector for electric circuits responds to said predetermined electrical condition in said circuit, said electrical conductor including telescoping elements, said elements being adapted to retract telescopically relative to each other and thereby maintain certain portions of said electrical conductor taut despite variations that may occur in the physical dimensions of said casing during storage and use, said telescoping elements being adapted to extend telescopically and permit one of said telescoping elements to project outwardly of said casing for said protector for electric circuits and serve as said indicator whenever said electrical conductor fuses.

2. In an enclosed protector for electric circuits that has a casing, spaced terminals, a fusible portion electrically connected between said terminals, and an indicator that is adapted to indicate the response of said protector for electric circuits to a predetermined electrical condition in the circuit that said protector for electric circuits protects, the improvement which comprises a current-carrying electrical conductor that is electrically connected in parallel relation with said protector for electric circuits, said electrical conductor being subject to fusing currents whenever said protector for electric circuits responds to said predetermined electrical condition in said circuit, said electrical conductor being spaced away from said fusible portion, said electrical conductor including telescoping elements, said elements being adapted to retract telescopically relative to each other and thereby maintain certain portions of said electrical conductor taut despite variations that may occur in the physical dimensions of said casing during storage and use, said telescoping elements being adapted to extend telescopically and permit one of said telescoping elements to project outwardly of said casing for said protector for electric circuits and serves as said indicator whenever said electrical conductor fuses, another of said telescoping elements being cylindrical, said one telescoping element normally having a substantial portion thereof disposed within said cylindrical telescoping element but being movable to displace said substantial portion thereof from said cylindrical telescoping element.

3. In an enclosed protector for electric circuits that has a casing, spaced terminals, and an indicator that is adapted to indicate the response of said protector for electric circuits to a predetermined electrical condition in the circuit that said protector for electric circuits protects, the improvement which comprises a current-carrying electrical conductor that is electrically connected in parallel relation with said protector for electric circuits, said electrical conductor being subject to fusing currents whenever said protector for electric circuits responds to said predetermined electrical condition in said circuit, said electrical conductor including a stationary element and a movable element biased for movement relative to said stationary element, said movable element of said electrical conductor normally being held stationary in retracted relation with said stationary element by other portions of said electrical conductor but telescoping to extended relation with said stationary element to serve as said indicator whenever said electrical conductor fuses.

4. In an enclosed protector for electric circuits that has a casing, spaced terminals, and an indicator that is adapted to indicate the response of said protector for electric circuits to a predetermined electrical condition in the circuit that said protector for electric circuits protects, the improvement which comprises a current-carrying electrical conductor that is electrically connected in parallel relation with said protector for electric circuits, said electrical conductor being subject to fusing currents whenever said protector for electric circuits responds to said predetermined electrical condition in said circuit, said electrical conductor including a stationary element and a movable element biased for movement relative to said stationary element, said movable element of said electrical conductor normally being held stationary in retracted relation with said stationary element by other portions of said electrical conductor but telescoping to extended relation with said stationary element to serve as said indicator whenever said electrical conductor fuses, said stationary element being cylindrical and being disposed inwardly of and immediately adjacent an opening in said casing for said protector for electric circuits, said movable element normally having a substantial portion thereof telescoped within said stationary element but being movable to project said substantial portion outwardly of said casing.

5. In an enclosed protector for electric circuits that has a casing, spaced terminals, and an indicator that is adapted to indicate the response of said protector for electric circuits to a predetermined electrical condition in the circuit that said protector for electric circuits protects, the improvement which comprises a current-carrying electrical conductor that is electrically connected in parallel relation with said protector for electric circuits, said electrical conductor being subject to fusing currents whenever said protector for electric circuits responds to said predetermined electrical condition in said circuit, said electrical conductor including telescoping elements, said elements being adapted to retract telescopically relative to each other and thereby maintain certain portions of said electrical conductor taut despite variations that may occur in the physical dimensions of said casing during storage and use, said telescoping elements being adapted to extend telescopically and permit one of said telescoping elements to project outwardly of said casing for said protector for electric circuits and serve as said indicator whenever said electrical conductor fuses, said telescoping elements being substantially enclosed within a closure, said closure for said telescoping elements being disposed within said casing for said protector for electric circuits.

6. In an enclosed protector for electric circuits that has a casing, spaced terminals, a fusible portion electrically connected between said terminals, and an indicator that is adapted to indicate the response of said protector for electric circuits to a predetermined electrical condition in the circuit that said protector for electric circuits protects, the improvement which comprises a current-carrying electrical conductor that is electrically connected in parallel relation with said protector for electric circuits, said electrical conductor being subject to fusing currents whenever said protector for electric circuits responds to said predetermined electrical condition in said circuit, said electrical conductor being spaced away from said fusible portion, said electrical conductor including telescoping elements, said elements being adapted to retract telescopically relative to each other and thereby maintain certain portions of said electrical conductor taut despite variations that may occur in the physical dimensions of said casing during storage and use, said telescoping elements being adapted to extend telescopically and permit one of said telescoping elements to project outwardly of said casing for said protector for electric circuits and serve as said indicator whenever said electrical conductor fuses, said electrical conductor including the telescoping elements thereof being substantially enclosed within a closure, said closure for said electrical conductor being disposed within said casing for said protector for electric circuits.

7. In an enclosed protector for electric circuits that has a casing, spaced terminals, a fusible portion electrically connected between said terminals, and an indicator that is adapted to indicate the response of the protector for electric circuits to a predetermined electrical condition in the circuit that said protector for electric circuits protects, the impprovement which comprises a current-carrying electrical conductor that is electrically connected in parallel relation with said protector for electric circuits, said electrical conductor being subject to fusing currents whenever said protector for electric circuits responds to said predetermined electrical condition in said circuit, said electrical conductor being spaced away from said fusible portion, said electrical conductor including telescoping elements, said elements being adapted to retract telescopically relative to each other and thereby maintain certain portions of said electrical conductor taut despite variations that may occur in the physical dimensions of said casing during storage and use, said telescoping elements being adapted to extend telescopically and permit one of said telescoping elements to project outwardly of said casing for said protector for electric circuits and serve as said indicator whenever said electrical conductor fuses, said telescoping elements being substantially enclosed within a closure, said closure for said telescoping elements being disposed within said casing for said protector for electric circuits, said closure for said telescoping elements being free of obstructions to the telescoping movement of said elements.

8. In an enclosed protector for electric circuits that has a casing, spaced terminals, and an indicator that is adapted to indicate the response of said protector for electric circuits to a predetermined electrical condition in the circuit that said protector for electric circuits protects, the improvement which comprises a current-carrying electrical conductor that is electrically connected in parallel relation with said protector for electric circuits, said electrical conductor being subject to fusing currents whenever said protector for electric circuits responds to said predetermined electrical condition in said circuit, said electrical conductor including telescoping elements, said elements being adapted to retract telescopically relative to each other and thereby maintain certain portions of said electrical conductor taut despite variations that may occur in the physical dimensions of said casing during storage and use, said telescoping elements being adapted to extend telescopically and permit one of said telescoping elements to project outwardly of said casing for said protector for electric circuits and serve as said indicator whenever said electrical conductor fuses, said electrical conductor including the telescoping elements thereof being substantially enclosed within a closure, said closure for said electrical conductor being disposed within said casing for said protector for electric circuits and being adjacent the inner surface of said casing, said closure for said electrical conductor being free of obstructions to the movement of said electrical conductor and the telescoping elements thereof and spacing said electrical conductor and the telescoping elements thereof from any filler in said casing.

9. In an enclosed protector for electric circuits that has a casing, spaced terminals, a fusible portion electrically connected between said terminals, and an indicator that is adapted to indicate the response of said protector for electric circuits to a predetermined electrical condition in the circuit that said protector for electric circuits protects, the improvement which comprises a current-carrying electrical conductor that is electrically connected in parallel relation with said protector for electric circuits, said electrical conductor being subject to fusing current whenever said protector for electric circuits responds to said predetermined electrical condition in said circuit, said electrical conductor being spaced away from said fusible portion, said electrical conductor including an elongated pin biased for movement outwardly of said casing for said protector for electric circuits, said pin normally being held retracted within said casing for said protector for electric circuits but being free to move outwardly of said casing for said protector for electric circuits upon the fusing of said electrical conductor.

10. In an enclosed protector for electric circuits that has a casing, spaced terminals, and an indicator that is adapted to indicate the response of said protector for electric circuits to a predetermined electrical condition in the circuit that said protector for electric circuits protects, the improvement which comprises a current-carrying electrical conductor that is electrically connected in parallel relation with said protector for electric circuits, said electrical conductor being subject to fusing currents whenever said protector for electric circuits responds to said predetermined electrical condition in said circuit, said electrical conductor including an elongated pin, a spring, and a stationary member which normally confines an appreciable portion of said pin and said spring, said spring biasing said portion of said pin outwardly of said stationary member, said pin and said spring being dimensioned relative to said stationary member so whenever said spring is compressed by the retraction of said pin within said stationary member, said spring is not fully compressed but can yield further to compensate for variations in the physical dimensions of said casing during storage and use.

11. In an enclosed protector for electric circuits that has a casing, spaced terminals, and an indicator that is adapted to indicate the response of said protector for electric circuits to a predetermined electrical condition in the circuit that said protector for electric circuits protects, the improvement which comprises a current-carrying electrical conductor that is electrically connected in parallel relation with said protector for electric circuits, said electrical conductor being subject to fusing currents whenever said protector for electric circuits responds to said predetermined electrical condition in said circuit, said electrical conductor including an elongated pin biased for movement outwardly of said casing for said protector for electric circuits, said pin normally being held retracted within said casing for said protector for electric circuits but being free to move outwardly of said casing for said protector for electric circuits upon the fusing of said electrical conductor, said electrical conductor including a stationary member that normally encloses a substantial portion of said pin.

12. In an enclosed protector for electric circuits that has a casing, spaced terminals, a fusible portion electrically connected between said terminals, and an indicator that is adapted to indicate the response of said protector for electric circuits to a predetermined electrical condition in the circuit that said protector for electric circuits protects, the improvement which comprises a current-carrying electrical conductor that is electrically connected in parallel relation with said protector for electric circuits, said electrical conductor being subject to fusing currents whenever said protector for electric circuits responds to said predetermined electrical condition in said circuit, said electrical conductor being spaced away from said fusible portion, said electrical conductor including an elongated pin biased for movement outwardly of said casing for said protector for electric circuits, said pin normally being held retracted within said casing for said protector for electric circuits but being free to move outwardly of said casing for said protector for electric circuits upon the fusing of said electrical conductor, said electrical conductor including a stationary member that normally encloses a substantial portion of said pin, and a spring that is disposed within said stationary member and surrounds said substantial portion of said pin.

13. In an enclosed protector for electric circuits that has a casing, spaced terminals, and an indicator that is adapted to indicate the response of said protector for electric circuits to a predetermined electrical condition in the circuit that said protector for electric circuits protects, the improvement which comprises a current-carrying electrical conductor that is electrically connected in parallel relation with said protector for electric circuits, said electrical conductor being subject to fusing currents whenever said protector for electric circuits responds to said predetermined electrical condition in said circuit, said electrical conductor including telescoping elements, said elements being adapted to retract telescopically relative to each other and thereby maintain certain portions of said electrical conductor taut despite variations that may occur in the physical dimensions of said casing during storage and use, said telescoping elements being adapted to extend telescopically and permit one of said telescoping elements to project outwardly of said casing for said protector for electric circuits and serve as said indicator whenever said electrical conductor fuses, said telescoping elements being substantially enclosed within a closure, said closure for said telescoping elements being disposed within said casing for said protector for electric circuits, said closure for said elements being much shorter than said casing for said protector for electric circuits to limit the expansion and contraction of said closure.

14. In an enclosed protector for electric circuits that has a casing, spaced terminals, a fusible portion electrically connected between said terminals, and an indicator that is adapted to indicate the response of said protector for electric circuits to a predetermined electrical condition in the circuit that said protector for electric circuits protects, the improvement which comprises a current-carrying electrical conductor that is electrically connected in parallel relation with said protector for electric circuits, said electrical conductor being subject to fusing currents whenever said protector for electric circuits responds to said predetermined electrical condition in said circuit, said electrical conductor being spaced-away from said fusible portion, said electrical conductor including an elongated pin, a spring, and a stationary member which normally confines an appreciable portion of said pin and said spring, said spring biasing said portion of said pin outwardly of said stationary member, said pin and said spring being dimensioned relative to said stationary member so whenever said spring is compressed by the retraction of said pin within said stationary member, said spring is not fully compressed but can yield further to compensate for variations in the physical dimensions of said casing during storage and use, said spring normally biasing said pin against and into electrical contact with said stationary member whereby said spring is largely free from current flow therethrough.

15. In an enclosed protector for electric circuits that has a casing, spaced terminals, and an indicator that is adapted to indicate the response of said protector for electric circuits to a predetermined electrical condition in the circuit that said protector for electric circuits protects, the improvement which comprises a current-carrying electrical conductor that is electrically connected in parallel relation with said protector for electric circuits, said electrical conductor being subject to fusing currents whenever said protector for electric circuits responds to said predetermined electrical condition in said circuit, a support that engages said casing and said protector for electric circuits and holds said protector for electric circuits in spaced relation to said casing, and a closure for a portion of said electrical conductor, said support holding said closure for said portion of said electrical conductor in predetermined relation to said protector for electric circuits and to said casing for said protector for electric circuits.

16. In an enclosed protector for electric circuits that has a casing, spaced terminals, and an indicator that is adapted to indicate the response of said protector for electric circuits to a predetermined electrical condition in the circuit that said protector for electric circuits protects, the improvement which comprises a current-carrying electrical conductor that is electrically connected in parallel relation with said protector for electric circuits, said electrical conductor being subject to fusing currents whenever said protector for electric circuits responds to said predetermined electrical condition in said circuit, a closure for said electrical conductor, an opening in said casing for said protector for electric circuits, and a support, said support engaging said closure for said electrical conductor and said casing for said protector for electric circuits to place said closure for said electrical conductor in register with said opening in said casing.

17. In an enclosed protector for electric circuits that has a casing, spaced terminals, a fusible portion electrically connected between said terminals, and an indicator that is adapted to indicate the response of said protector for electric circuits to a predetermined electrical condition in the circuit that said protector for electric circuits protects, the improvement which comprises a current-carrying electrical conductor that is electrically connected in parallel relation with said protector for electric circuits, said electrical conductor being subject to fusing currents whenever said protector for electric circuits responds to said predetermined electrical condition in said circuit, said electrical conductor being spaced away from said fusible portion, said electrical condutor including telescoping elements, said elements being adapted to retract telescopically relative to each other and thereby maintain certain portions of said electrical conductor taut despite variations that may occur in the physical dimensions of said casing during storage and use, said telescoping elements being adapted to extend telescopically and permit one of said telescoping elements to project outwardly of said casing for said protector for electric circuits and serve as said indicator whenever said electrical conductor fuses, said telescoping elements having interlocking surfaces thereon whereby said elements are always held in assembled relation.

18. In an enclosed protector for electric circuits that has a casing, spaced terminals, and an indicator that is adapted to indicate the response of said protector for electric circuits to a predetermined electrical condition in the circuit that said protector for electric circuit protects, the improvement which comprises a current-carrying electrical conductor that is electrically connected in parallel relation with said protector for electric circuits, said electrical conductor being subject to fusing currents whenever said protector for electric circuits responds to said predetermined electrical condition in said circuit, a closure for said electrical conductor, said closure being disposed within said casing for said protector for electric circuits.

19. In an enclosed protector for electric circuits that has a casing, spaced terminals, a fusible portion electrically connected between said terminals, and an indicator that is adapted to indicate the response of said protector for electric circuits to a predetermined electrical condition in the circuit that said protector for electric circuits protects, the improvement which comprises a current-carrying electrical conductor that is electrically connected in parrallel relation with said protector for electric circuits, said electrical conductor being subject to fusing currents whenever said protector for electric circuits responds to said predetermined electrical condition in said circuit, said electrical conductor being spaced away from said fusible portion, said electrical conductor including telescoping elements, said elements being adapted to retract telescopically relative to each other and thereby maintain certain portions of said electrical conductor taut despite variations that may occur in the physical dimensions of said casing during storage and use, said telescoping elements being adapted to extend telescopically and permit one of said telescoping elements to project outwardly of said casing for said protector for electric circuits and serve as said indicator whenever said electrical conductor fuses, said one element having a color which is different and distinctive from the color of said casing and terminals of said protector for electric circuits.

20. In an enclosed protector for electric circuits that has a casing, spaced terminals, a fusible portion electrically connected between said terminals, and an indicator that is adapted to indicate the response of said protector for electric circuits to a predetermined electrical condition in the circuit that said protector for electric circuits protects, the improvement which comprises a current-carrying electrical conductor that is electrically connected in parallel relation with said protector for electric circuits, said electrical conductor being subject to fusing currents whenever said protector for electric circuits responds to said predetermined electrical condition in said circuit, said electrical conductor being spaced away from said fusible portion, said electrical conductor including telescoping elements, said elements being adapted to retract telescopically relative to each other and thereby maintain certain portions of said electrical conductor taut despite variations that may occur in the physical dimensions of said casing during storage and use, said telescoping elements being adapted to extend telescopically and permit one of said telescoping elements to project outwardly of said casing for said protector for electric circuits and serve as said indicator whenever said electrical conductor fuses, said one element normally being disposed wholly within said casing for said protector for electric circuits.

JOHN C. LEBENS, JR.

References Cited in the file of this patent

UNITED STATES PATENTS

| Number | Name | Date |
|---|---|---|
| 873,793 | Sachs | Dec. 17, 1907 |
| 2,417,268 | Powell | Mar. 11, 1947 |